US012368665B2

(12) United States Patent
Desai et al.

(10) Patent No.: US 12,368,665 B2
(45) Date of Patent: Jul. 22, 2025

(54) DIFFERENTIATED MULTIHOMED ROUTE ADVERTISEMENT FOR MULTIPATH TCP

(71) Applicant: Cisco Technology, Inc., San Jose, CA (US)

(72) Inventors: Ronak Desai, Oakland, CA (US); Yibin Yang, San Jose, CA (US); Rajagopalan Janakiraman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 731 days.

(21) Appl. No.: 17/674,255

(22) Filed: Feb. 17, 2022

(65) Prior Publication Data

US 2023/0261972 A1 Aug. 17, 2023

(51) Int. Cl.
*H04L 45/24* (2022.01)
*H04L 45/74* (2022.01)

(52) U.S. Cl.
CPC .............. *H04L 45/24* (2013.01); *H04L 45/74* (2013.01)

(58) Field of Classification Search
CPC ................................ H04L 45/24; H04L 45/74
See application file for complete search history.

(56) References Cited

U.S. PATENT DOCUMENTS

| | | | |
|---|---|---|---|
| 9,455,897 B2 * | 9/2016 | Krishnaswamy | ..... H04L 69/165 |
| 10,659,569 B1 | 5/2020 | Tourrilhes et al. | |
| 10,979,355 B2 * | 4/2021 | Kiss | ....... H04L 47/193 |
| 2016/0212759 A1 * | 7/2016 | Schliwa-Bertling | ......... H04W 40/36 |
| 2017/0208104 A1 * | 7/2017 | Wei | ........... H04L 9/40 |
| 2019/0132241 A1 | 5/2019 | Vattem et al. | |
| 2020/0287780 A1 | 9/2020 | Singh et al. | |
| 2021/0329069 A1 | 10/2021 | Desmouceaux et al. | |
| 2021/0352749 A1 * | 11/2021 | Szilagyi | ................ H04W 80/06 |

FOREIGN PATENT DOCUMENTS

| | | | | |
|---|---|---|---|---|
| EP | 3364624 A1 * | 8/2018 | | |
| EP | 3944593 A1 * | 1/2022 | ............. | H04L 45/24 |
| FR | 3032852 A1 * | 8/2016 | ......... | H04L 12/5691 |
| WO | WO-2011127189 A2 * | 10/2011 | ....... | H04L 29/12952 |
| WO | WO-2016049933 A1 * | 4/2016 | ............. | H04L 29/06 |

* cited by examiner

*Primary Examiner* — Saad A. Waqas
(74) *Attorney, Agent, or Firm* — Lee & Hayes, P.C.

(57) ABSTRACT

In one embodiment, a method comprises determining, by a first networking device, that a first subflow of a multipath transmission control protocol (MPTCP) connection has been established between a first internet protocol (IP) address of a first computing device and an IP address of a second computing device, wherein the first computing device is multihomed to the first networking device and a second networking device. The method also includes determining, by the first or second networking device, a request to establish a second subflow of the MPTCP connection between a second IP address of the first computing and the IP address of the second computing device. In addition, the method includes advertising, by the first networking device, a primary IP address (PIP) of the first networking device for the first subflow and advertising, by the second networking device, a PIP of the second networking device for the second subflow.

20 Claims, 10 Drawing Sheets

DIFFERENTIATED MULTIHOMED ROUTE ADVERTISEMENT FOR MULTIPATH TCP

TECHNICAL FIELD

The present disclosure relates generally to techniques for effective multipath TCP (MPTCP) through differentiated multihomed route advertisements in a switched network.

BACKGROUND

In today's digital world, more and more users operate client computing devices to consume digital content. Further, much of this content is provided from content sources stored on server computing devices to respective client computing devices over networks of data centers that house servers, routers, and other networking devices. For example, a source device may send content, such a live video stream or any other type of content, to client computing devices via a networking fabric of switches, routers, and other computer networking devices.

In some instances, when a client computing device requests data from a content source stored on a server computing device in a switched network, the client computing device establishes a transmission control protocol (TCP) connection between an Internet Protocol (IP) address associated with the client computing device and an IP address associated with the server computing device. Further, in some instances the client computing device may utilize a multipath TCP (MPTCP) connection to establish multiple connections, or subflows, between the client computing device and the server computing device. However, if each of these subflows are routed along the same path in the switched network, then the overall connection between the client computing device and the server computing device might not be resilient to network failures.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
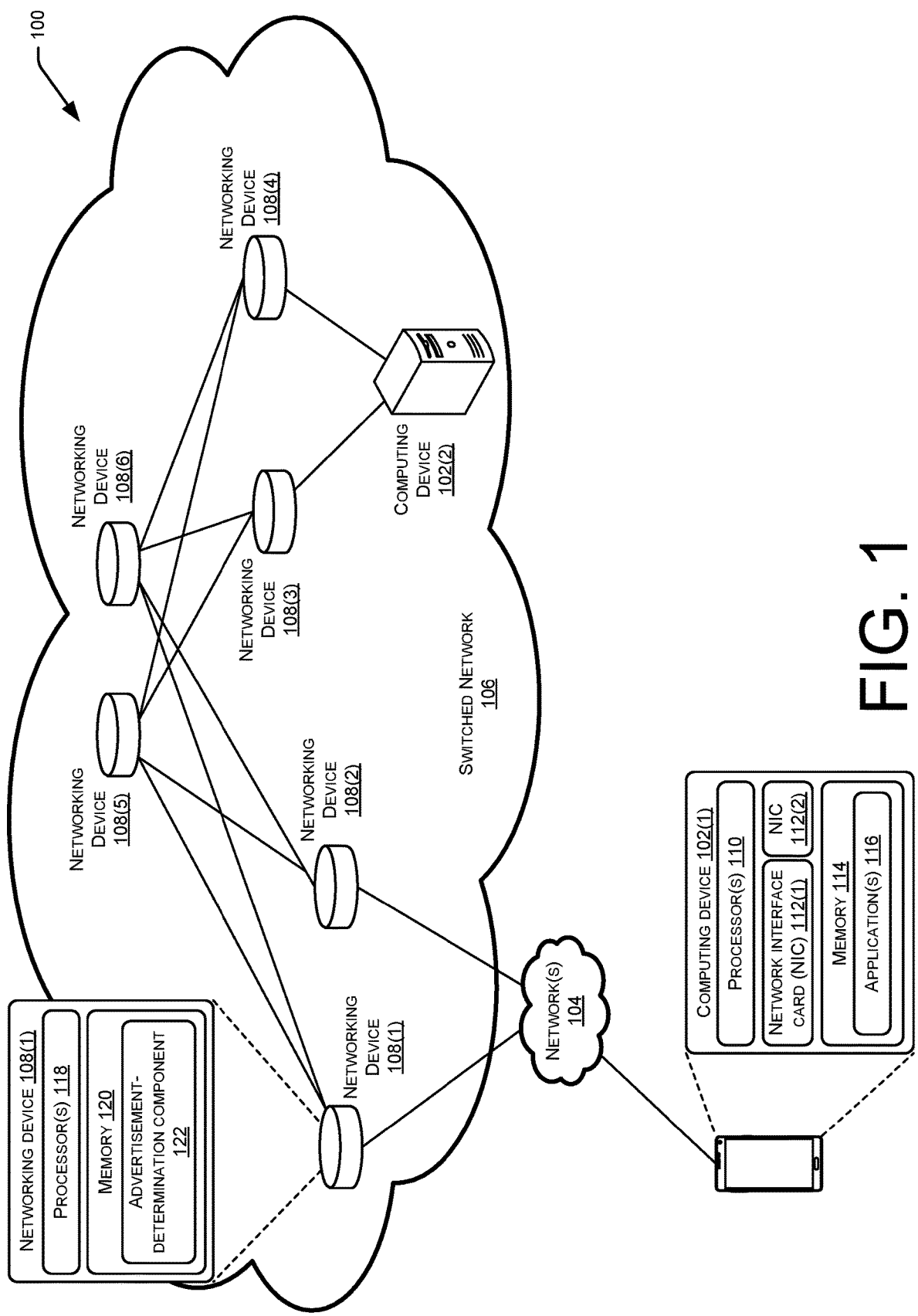
FIG. 1 illustrates a system-architecture diagram of an example environment in which a first computing device (here, a client computing device) is configured to establish a first subflow of a multipath transmission control protocol (MPTCP) connection between an internet protocol (IP) address associated with a first network interface controller (NIC) of the first computing device and an IP address associated with a second computing device (here, a server computing device), as well as a second subflow of the MPTCP connection between an IP address associated with a second NIC of the first computing device and the IP address associated with the second computing device. Further, the environment includes two networking devices (e.g., switches) to which that the first computing device is multihomed and that, in response to identifying the two subflows of the same MPTCP connection, are configured to advertise their respective primary IP (PIP) addresses for one but not both of the two subflows such that the routes for the two subflows in the illustrated switched network do not fully overlap.

This disclosure describes, in part, a method comprising determining, by a first networking device in a switched network, that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network. The method also includes determining, by at least one of the first networking device or the second networking device, a request to establish a second subflow of the MPTCP connection between a second IP address of the first computing and the IP address of the second computing device. In addition, the method includes advertising, by the first networking device, a primary IP address (PIP) of the first networking device as nexthop for the first subflow address, i.e., the first internet protocol (IP) address of the first computing device, and advertising, by the second networking device, a PIP of the second networking device as nexthop for the second subflow address, i.e., second internet protocol (IP) address of the first computing device.

This disclosure also describes, in part, a first networking device of a switched network, comprising one or more processors and one or more computer-readable media storing computer-executable instructions that, when executed, cause the one or more processors to perform acts comprising determining that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network. The acts may also include determining a request to establish a second subflow of the MPTCP connection between a second IP address of the first computing device and the IP address of the second computing device, as well as advertising a primary IP address (PIP) of the first networking device as nexthop for the first subflow address, i.e., the first IP address of the first computing device, and instructing the second networking device to advertise a PIP of the second networking device as nexthop for the second subflow address, i.e., the second IP address of the first computing device.

Additionally, the techniques described herein may be performed via methods, devices, and/or non-transitory computer-readable media storing computer-executable instructions that, when executed by one or more processors, performs methods described herein.

Example Embodiments

Multipath Transmission Protocol (MPTCP) is an extension to the traditional TCP. For a single TCP connection between two computing devices, MPTCP may establish multiple subflows using different source and/or destination IP addresses for the purpose of high availability. If the network paths followed by subflows are not the same, the TCP connection can enjoy higher throughput and improved resilience to network failures, even if they may be partially overlapped. However, if the network paths are fully overlapped, the purpose and benefits of MPTCP may be defeated or reduced.

Described herein are techniques to minimize the likelihood that individual subflows of a common MPTCP connection fully overlap within a switched network. For example envision that a first computing device, such as a client computing device, receives a user request to establish a connection over TCP to a second computing device, such as a server computing device, in a switched network. For instance, the user request may comprise a request to stream a video, download content, visit a website, or a request to receive any other content hosted at the second computing device. Further, in this example envision that the first computing device is multihomed to at least two networking devices (e.g., switches, routers, etc.) within the switched network.

To begin, the first computing device may establish a TCP connection between an IP address associated with the first computing device and an IP address associated with the second computing device. For instance, the TCP connection may comprise a connection between an IP address associated with a first network interface controller (NIC) of the first computing device, such as a NIC configured to access cellular network, a WiFi network, or the like. Upon determining that the TCP connection has been established between the IP address of the first NIC of the first computing device and the IP address of the second computing device, each of the first and second networking devices to which the first computing device is multihomed may determine this connection. In response, each of the first and second networking devices may be configured to advertise an IP address that it is associated with such that other networking devices in the switched network can reach these networking devices for sending data traffic associated with the TCP connection to one or both of the first and second networking devices. These networking devices may then route the data traffic down to the first computing device.

In instances where the first and second networking devices initially determine the TCP connection, each of the first and second networking devices (to which the first computing device is multihomed) may advertise, to the other networking devices in the switched network, a secondary IP address that is virtually associated with both: (1) the first networking device, and (2) the second networking device. Therefore, when an upstream networking device in the switched network sends data associated with the TCP connection (and from the second computing device) downstream towards the first computing device, the upstream networking device may address these data packets to the secondary IP address advertised by the first and second networking switches. Given that this secondary IP address is associated with both the first and second networking devices, the data packets may be sent to any of the first and second networking devices, i.e., load balanced between these networking devices. The likelihood that the data packets reach the first computing device is relatively higher than if a single PIP of a networking device is advertised, in that the path to the first computing device can travel "through" the first networking device or the second networking device, thus having redundancy in the event that one of the networking devices or network link fails.

In some instances, however, the first computing device may establish a second subflow of the same MPTCP connection with the second computing device. For instance, the first computing device and other devices in the network may use a command such as MP_JOIN, ADD_ADDR, or the like for establishing a second subflow of the MPTCP connection. Details regarding techniques for establishing multiple subflows for an MPTCP connection may be found in Internet Engineering Task Force (IETF), Request for Comments (RFC) 8684, available at https://datatracker.ietf.org/doc/html/rfc8684.html, which is incorporated herein by reference.

In some instances, the first and/or second networking devices that the first computing device is multihomed to may detect the request to establish this second subflow of the same MPTCP connection. For instance, the first and/or second networking devices may snoop a MPTCP packet sent from or to the first computing device to identify that a second subflow is being or has been established between a second IP address of the first computing device and the IP address of the second computing device (or with a second IP address of the second computing device). For instance, while the first subflow of the MPTCP connection may comprise a connection between a first NIC of the first computing device configured to access a cellular network, the second subflow of the MPTCP connection may comprise a connection between a second NIC of the first computing device configured to access a WiFi or other network. Of course, while one example is given, it is to be appreciated that the subflows may be associated with any type of NICs of the first computing device.

As introduced above, individual subflows may benefit from being associated with different routes in the switched network from/to the second computing device in order to provide network redundancy. Stated otherwise, if the two or other number of subflows is routed along the same route, then failure within the route may interrupt both subflows. Thus, reliability of the MPTCP connection (and a quality of a user experience) may be increased if the individual subflows are diverse (i.e., do not fully overlap). In addition, it is to be appreciated that in addition to increasing reliability, the establishment of multiple subflows increases the amount of data throughout provided to the first computing device, given that data can be sent and received on both the first NIC via the first subflow and the second NIC via the second subflow.

As described herein, one or both of the first and second networking devices that the first computing device is multihomed to may be configured to increase the likelihood (or ensure) that the respective routes of the first and second subflows of the MPTCP connection do not fully overlap in the switched network. For instance, upon determining that a second subflow of the same MPTCP connection has been or is being established, the first networking device may determine to switch from advertising, upstream to the other networking devices in the switched network and for the first subflow, the secondary IP address associated with both the first and second networking devices to the PIP associated with the first networking device as the nexthop. In addition, the first networking device may send an instruction to the second networking to begin advertising, upstream to the other networking devices in the switched network and as the nexthop for the second subflow, the secondary IP address associated with both the first and second networking devices. Thus, by the first networking device advertising its PIP as nexthop for the first subflow (which is associated with the IP address of the first NIC of the first computing device), the other networking devices in the networking will send data packets associated with the first subflow to the first networking device, which will in turn send these data packets to the first NIC of the first computing device. Similarly, by the second networking device advertising its PIP as nexthop for the second subflow (which is associated with the IP address of the second NIC of the first computing device), the other networking devices in the networking will send data packets associated with the second subflow to the second networking device, which will in turn send these data packets to the second NIC of the first computing device. Thus, the first and second networking devices have collectively ensured that the route associated with the first subflow of the MPTCP connection does not entirely overlap with the route associated with the second subflow of the MPTCP connection.

Further, if the first or second networking device determines that its peer networking device i.e., the second or the first networking device, respectively, has failed, the networking device that is still operational may again begin advertising for both the first and second subflows. For instance, this networking device may advertise, for both the first and second subflows, the secondary address associated with both the first and second networking devices as nexthop. Further, while some of the examples described herein are discussed with reference to the networking devices, to which the first computing device is multihomed, advertising their PIPs for individual subflows of an MPTCP connection, it is to be appreciated that other peer networking devices in the switched network may be perform similar techniques for providing further differentiation between routes of the first and second subflows.

For instance, envision that the second computing device is multihomed to two networking devices, such as a third networking device and a fourth networking device. Similar to the techniques described above, if the second computing device is associated with a single IP address (or, rather, the MPTCP connection with the second computing device is associated with a single IP address), then both the third and the fourth networking devices may advertise, for both the first and second subflows, a secondary IP address that is associated with the third networking device and the fourth networking device. If, however, the first subflow is associated with a first IP address of the second computing device and the second subflow is associated with a second IP address of the second computing device, then the third networking device may be configured to advertise its PIP address for the first subflow while the fourth networking device may be configured to advertise its PIP address for the second subflow.

It is to be appreciated that these techniques may be performed dynamically or statically. For instance, and as described above, the networking switches may be configured to detect the establishment of a second (or subsequent) subflow of an MPTCP connection and, automatically and in response, assign respective responsibilities to the peer networking devices for handling different subflows. For instance, a first networking device may automatically begin advertising its PIP address for the first subflow while the second, peer networking device may begin advertising its PIP address for the second subflow. In other instances, meanwhile, a network administrator of the switched network may manually configure the first networking device to begin advertising its PIP address for the first subflow and may manually configure the second, peer networking device to begin advertising its PIP address for the second subflow.

FIG. 1 illustrates a system-architecture diagram of an example environment 100 in which a first computing device 102(1) (here, a client computing device) is configured to establish a first subflow of a multipath transmission control protocol (MPTCP) connection between an internet protocol (IP) address associated with a first network interface controller (NIC) of the first computing device and an IP address associated with a second computing device 102(2) (here, a server computing device), as well as a second subflow of the MPTCP connection between an IP address associated with a second NIC of the first computing device 102(1) and the IP address associated with the second computing device 102(2). As illustrated, data exchanged between the first computing device 102(1) and the second computing device 102(2) may travel over one or more networks 104 (e.g., provider networks, an internet service provider Internet, etc.) and through a switched network 106 (e.g., a data-center network) in which the second computing device 102(2) resides in this example. In some instances, the switched network 106 may comprise a BGP EVPN VXLAN network or other type of network used for routing traffic in a data center.

The switched network 106 may comprise an array of computing devices, such as gateways, routers, network bridges, wireless access points, networking cables, switches, protocol converters, servers, firewalls, network address translators, multiplexers, network interface controllers, wireless network interface controllers, and/or the like. In some examples, the switched network 106 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, the switched network 106 may include one or more networking devices 108(1), 108(2), 108(3), 108(4), 108(5), and 108(6) that are configured to route traffic within and through the switched network. While six networking devices are shown in this example, it is to be appreciated that the switched network 106 can include any number of networking devices and other devices. In this example, the networking devices 108(1), 108(2), 108(3), and 108(4) comprise "leaf" networking devices that reside at an edge of the switched network 106, while the networking devices 108(5) and 108(6) comprise "spine" networking devices that interconnect networking devices within the switched network 106. As illustrated, the first computing device 102(1) may be multihomed to the networking devices 108(1) and 108(2), while the second computing device 108(2) may be multihomed to the networking devices 108(3) and 108(4). As is known, multihoming a source and/or receive computing device to multiple network devices may increase network reliability by enabling traffic to continue to be sent and/or received at the source and/or destination devices in the event that one of the two (or more) networking devices experiences a failure.

As illustrated, the first computing device 102(1) may comprise one or more processors 110, a network interface controller (NIC) 112(1), a NIC 112(2), and memory 114, which may store one or more applications 116. In some instances, the NIC 112(1) may comprise a NIC that is configured to access a cellular network, while the NIC 112(2) may comprise a NIC that is configured to access a WiFi network or the like. Of course, in other instances each NIC may be configured to access a cellular network, each may be configured to access a WiFi networking, and/or these NICs may be configured to access any one or more of an array of network types.

Regardless of the network types that the NICs are configured to access, the computing device 102(1) may set up a subflow of an MPTCP connection with each of the NICs 112(1) and 1122(2) to increase reliability and throughput of data at the computing device 102(1), as described in further detail below. For instance, in this example a user of the computing device 102(1) may request that the computing device 102(1) acquire content from the second computing device 102(2). For instance, a user may request that the computing device 102(1) output content (e.g., a video, music, etc.) that is stored at the computing device 102(2). In response to this request, the computing device 102(1) may establish a TCP connection through the network(s) 104 and the switched network 106 with the computing device 102(2). As is known, in order to facilitate traffic via this connection, each of the networking devices 108 within the switched fabric may advertise addresses (e.g., IP addresses) as a "next hop" in the network 106 such that the networking devices know how to route traffic between the computing devices 102(1) and 102(2). This TCP connection may be established between an IP address associated with one of the NICs 112 and an IP address associated with the computing device 102(2). In this example, the computing device 102(1) may establish the TCP connection between the IP address associated with the NIC 112(1) and the IP address associated with the computing device 102(2).

As illustrated, an example networking device 108(1) includes one or more processors 118 and memory 120, which may store an advertisement-determination component 122. As described in detail below, the advertisement-determination component may be configured to determine which IP address to advertise to other networking devices in the switched network in a manner that increases the likelihood that individual subflows of an MPTCP connection do not share identical routes through the switched network. It is to be appreciated that while FIG. 1 shows the components of the example networking device 108(1), other networking device(s) 108 in the switched network 106 may include similar or the same components.

In this example, upon the computing device 102(1) establishing a TCP connection with the computing device 102(2), the networking device 108(1) may advertise, for the TCP connection and as a next hop, its own primary IP (PIP) address or a secondary IP address that is virtually associated with both itself and the networking device 108(2), which the computing device 102(1) is also multihomed to. As described above, advertising the secondary IP address by both networking devices 108(1) and 108(2) may be beneficial for providing redundancy in case one of the networking devices 108(2) and/or an ingoing or outgoing network link experiences a failure.

In some instances, meanwhile, the computing device 102(1) may establish a second subflow of the same MPTCP connection between the computing device 102(1) and the computing device 102(2). For instance, the computing device 102(1) may establish a second subflow between the IP address associated with the NIC 112(2) and the IP address associated with the computing device 102(2). Thus, at this moment, the MPTCP connection may comprise a first subflow between the NIC 112(1) and the computing device 102(2) and a second subflow between the NIC 112(2) and the computing device 102(2).

In some instances, one of the networking devices 108(1) and 108(2) may detect the establishment of this second subflow, in response, may change the IP address that one or both of the networking devices 108(1) and 108(2) are advertising. For example, one or both of the networking devices 108(1) and 108(2) may snoop a packet sent along the MPTCP connection to identify a command such as MP_JOIN, ADD_ADDR, or the like for establishing a second subflow of the MPTCP connection. Upon identifying this command, each networking device 108(1) and 108(2) to which that the computing device is multihomed may, for instance, switch from advertising a secondary IP address to advertising its own PIP address for the first or second subflow, but not for the other. For example, the advertisement-determination component 122 executing on the networking device 108(1) may cause the networking device 108(1) to begin advertising, for the first subflow, the PIP address associated with the networking device 108(1). In addition, the advertisement-determination component 122 executing on the networking device 108(1) may send an instruction to the networking device 108(2) to cause the networking device 108(2) to begin advertising, for the second subflow, the PIP address associated with the networking device 108(2). At this point, other networking devices in the switched network may send traffic for the first subflow to the networking device 108(1) (and not to the networking device 108(2)) and may send traffic for the second subflow to the networking device 108(2) (and not to the networking device 108(1)). Thus, differentiation exists between the routes of the first and second subflows within the switched network. Further, while this example describes the advertisement-determination component 122 executing on the networking device 108(1) sending the instruction to the networking device 108(2), in other instances the networking device 108(1) may execute an instance of the advertisement-determination component 122 for determining that the networking device 108(2) is to advertise its PIP address for the second subflow. It is to be appreciated that these networking devices 108(1) and 108(2) may determine which networking device is responsible for which subflow in any number of ways, including communicating with one another, being configured to execute a previously agreed-upon algorithm for making this determination, or the like.

FIGS. 2A-D collectively illustrate a sequence of operations 200 in which the two subflows of the MPTCP connection of FIG. 1 are established and, in response, the first networking device 108(1) that the first computing device is multihomed to advertises its PIP address for the first subflow and the second networking device 108(2) that the first computing device is multihomed to advertises its PIP address for the second subflow. It is to be appreciated that while this and other examples describe two subflows, any number of subflows may be established for an MPTCP connection in unison with the techniques described herein. For instance, if the first computing device has three NICs, three subflows may be established, if the first computing device has four NICs, four subflows may be established, and so forth. In these examples, a first networking device may advertise its PIP for multiple subflows and/or the second networking device may advertise its PIP for multiple remaining subflows, provided their advertised subflows are non-overlapping.

Figure 2A:
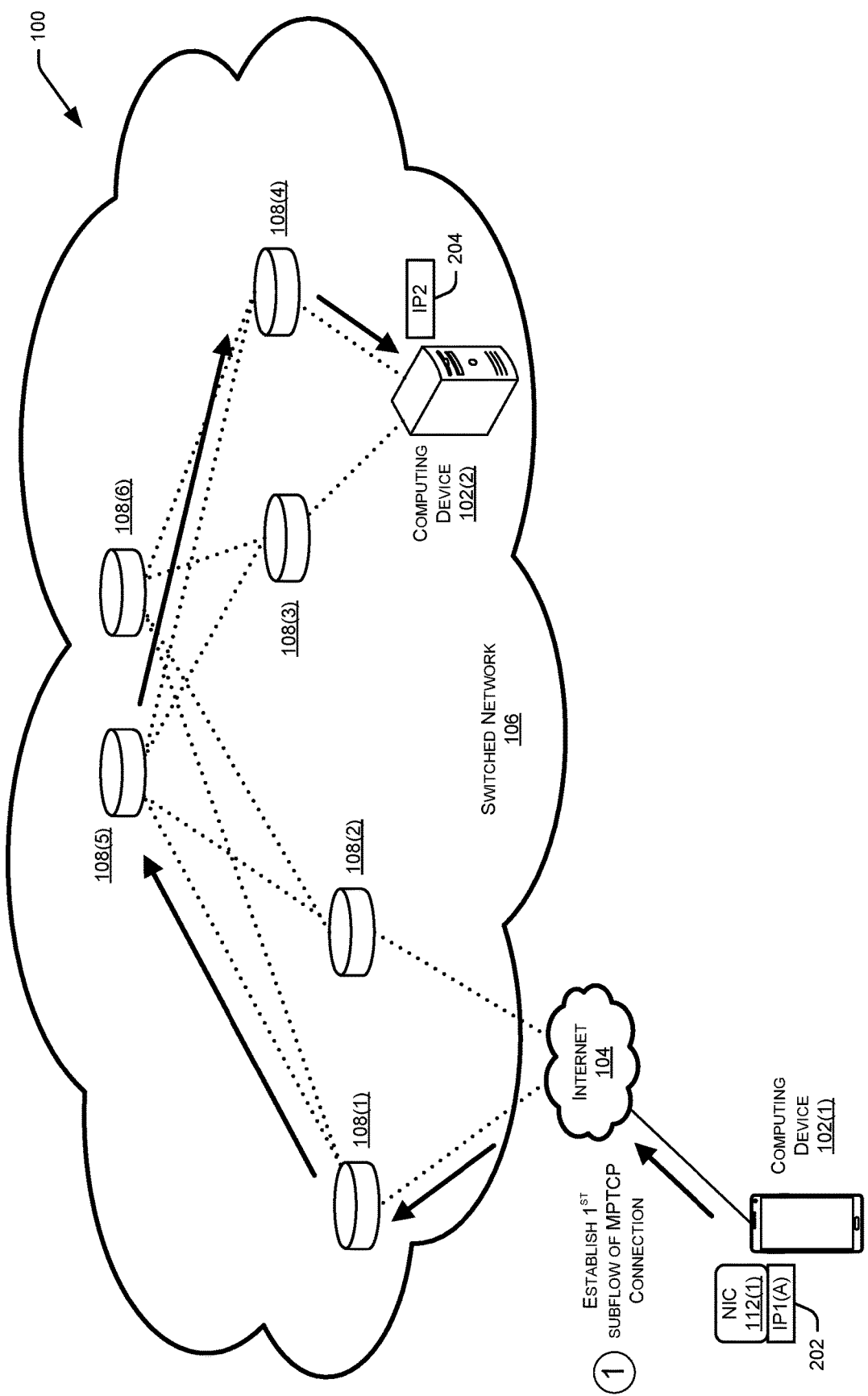
FIGS. 2A-D collectively illustrate a sequence of operations in which two subflows of an MPTCP connection are established and, in response, the first networking device that the first computing device is multihomed to advertises its PIP address as nexthop for the first subflow and the second networking device that the first computing device is multihomed to advertises its PIP address as nexthop for the second subflow.

At an operation "1", the computing device 102(1) establishes a first subflow of an MPTCP connection between: (1) an IP address 202 associated with the NIC 112(1) ("IP1(A)") and (2) an IP address 204 associated with the computing device 102(2) ("IP2"). While FIG. 2A illustrates an example route of the first subflow of the MPTCP connection, it to be appreciated that the route may differ and may change across data packets sent over time between the computing devices 102(1) and 102(2).

Figure 2B:
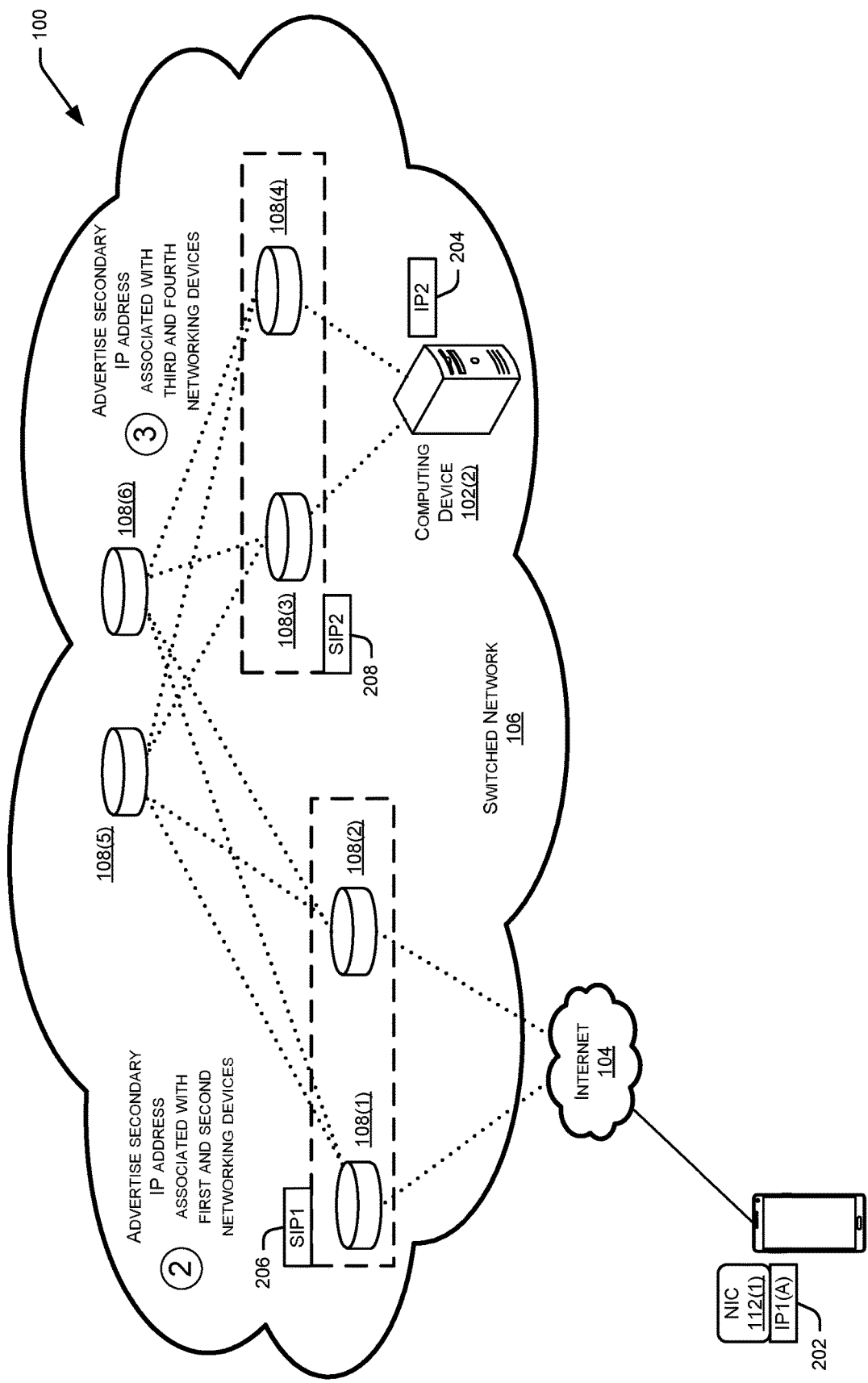

FIG. 2B continues the illustration of the sequence of operations 200 and includes, at an operation "2", both of the networking devices 108(1) and 108(2) that the computing device 102(1) is multihomed to advertising, for the first subflow, a secondary IP address ("SIP1") 206 that is virtually associated with both the networking device 108(1) and the networking device 108(2). By advertising this secondary IP address upstream within the switched network, other networking devices will send traffic for this subflow to this secondary address which will be routed to either of the networking devices 108(1) and 108(2) depending on implementation. In addition, at an operation "3", the networking devices 108(3) and 108(4) that the computing device 102(2) is multihomed to may advertise, for the first subflow, a secondary IP address ("SIP2") 208 that is associated with both the networking device 108(3) and the networking device 108(4).

Figure 2C:
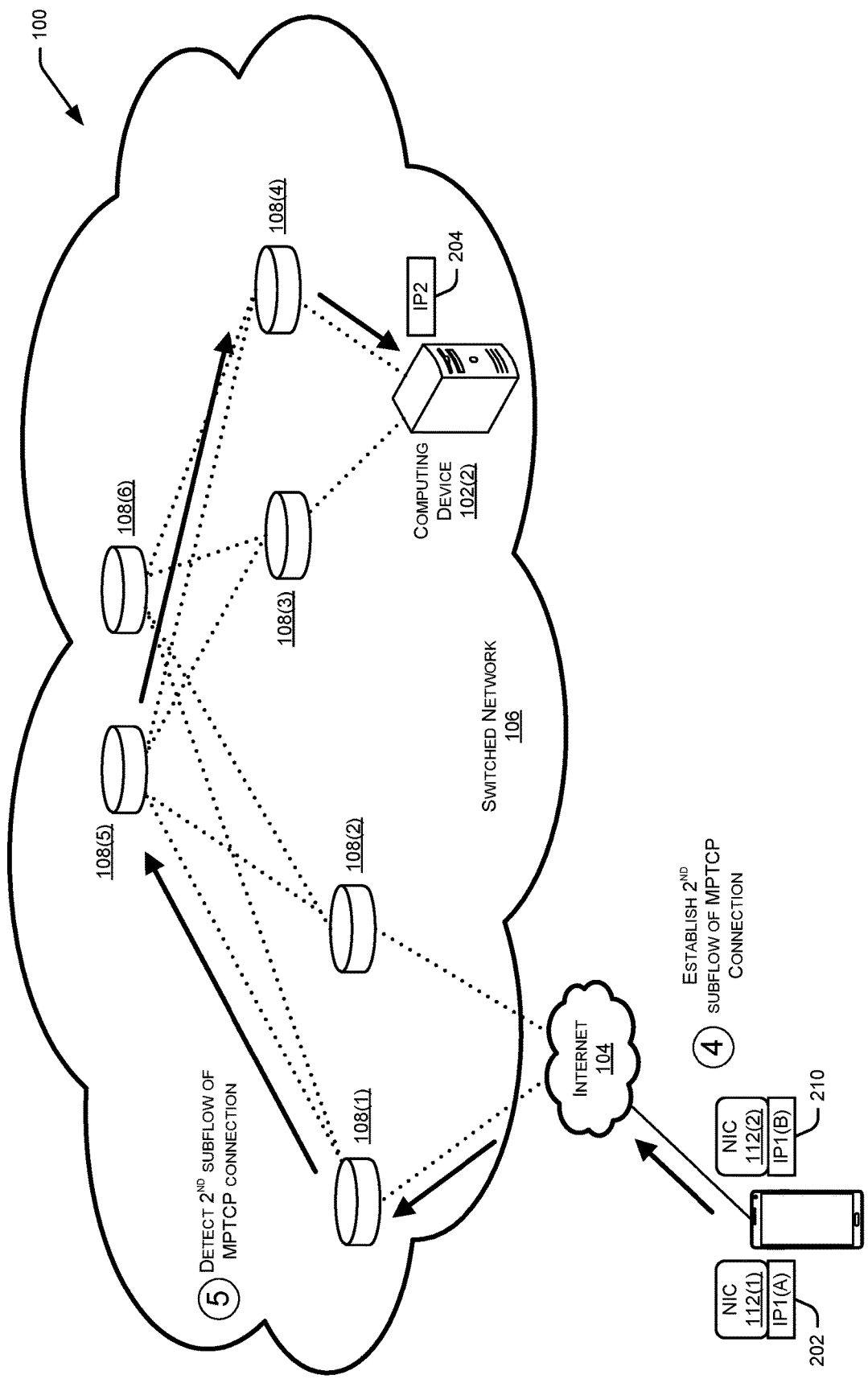

FIG. 2C continues the illustration of the sequence of operations 200 and includes, at an operation "4", the computing device 102(1) establishing a second subflow of the MPTCP connection between: (1) an IP address 210 associated with the NIC 112(2) ("IP1(B)") and (2) the IP address 204 associated with the computing device 102(2) ("IP2"). This may comprise the computing device 102(1) sending an MP_JOIN command. At an operation "5", in this example the networking device 108(1) may detect the second subflow of the MPTCP connection. For instance, the networking device 108(1) may snoop and analyze a MPTCP packet to identify the command to establish the second subflow. Of course, in other instances one or more other networking devices may additionally or alternatively snoop and analyze the MPTCP to identify the command to establish the second subflow.

Figure 2D:
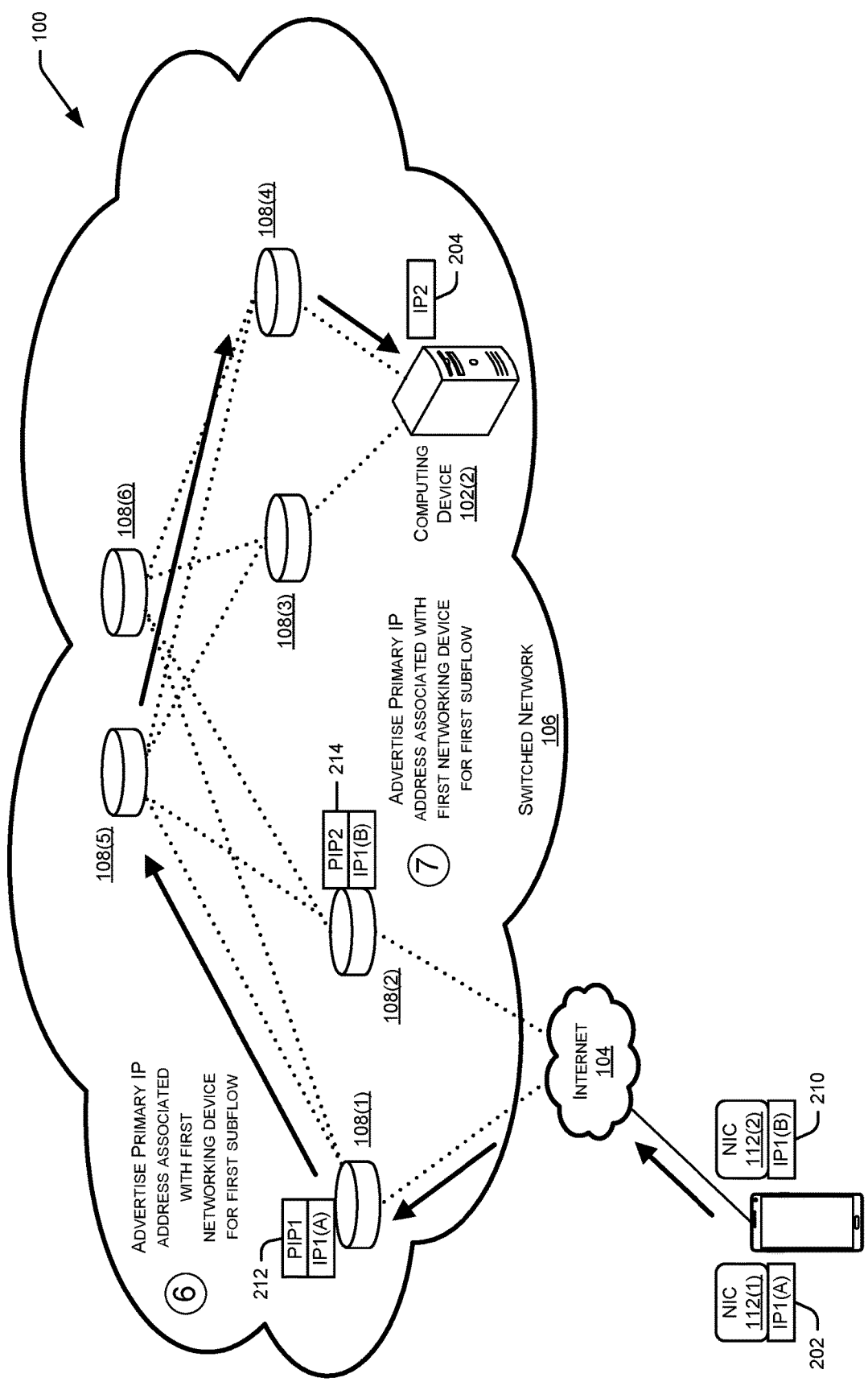

FIG. 2D continues the illustration of the sequence of operations 200 and includes, at an operation "6", the networking device 108(1) advertising its PIP address ("PIP1") 212 for the first subflow and, at an operation "7", the networking device 108(2) advertising its PIP ("PIP2") 214 address for the second subflow. For instance, in response to detecting the second subflow for the existing MPTCP connection, the advertisement-determination component 122 executing on the networking device 108(1) may determine to switch from advertising the secondary IP address 206 to advertising the PIP 212 such that traffic for this subflow is routed to the networking device 108(1) (and not the networking device 108(2)). In addition, the advertisement-determination component 122 may instruct the networking device 108(2) to switch from advertising the secondary IP address 206 to advertising the PIP 214 such that traffic for this subflow is routed to the networking device 108(2) (and not the networking device 108(2)), thus ensuring route differentiation between the first and second subflows.

Figure 3:
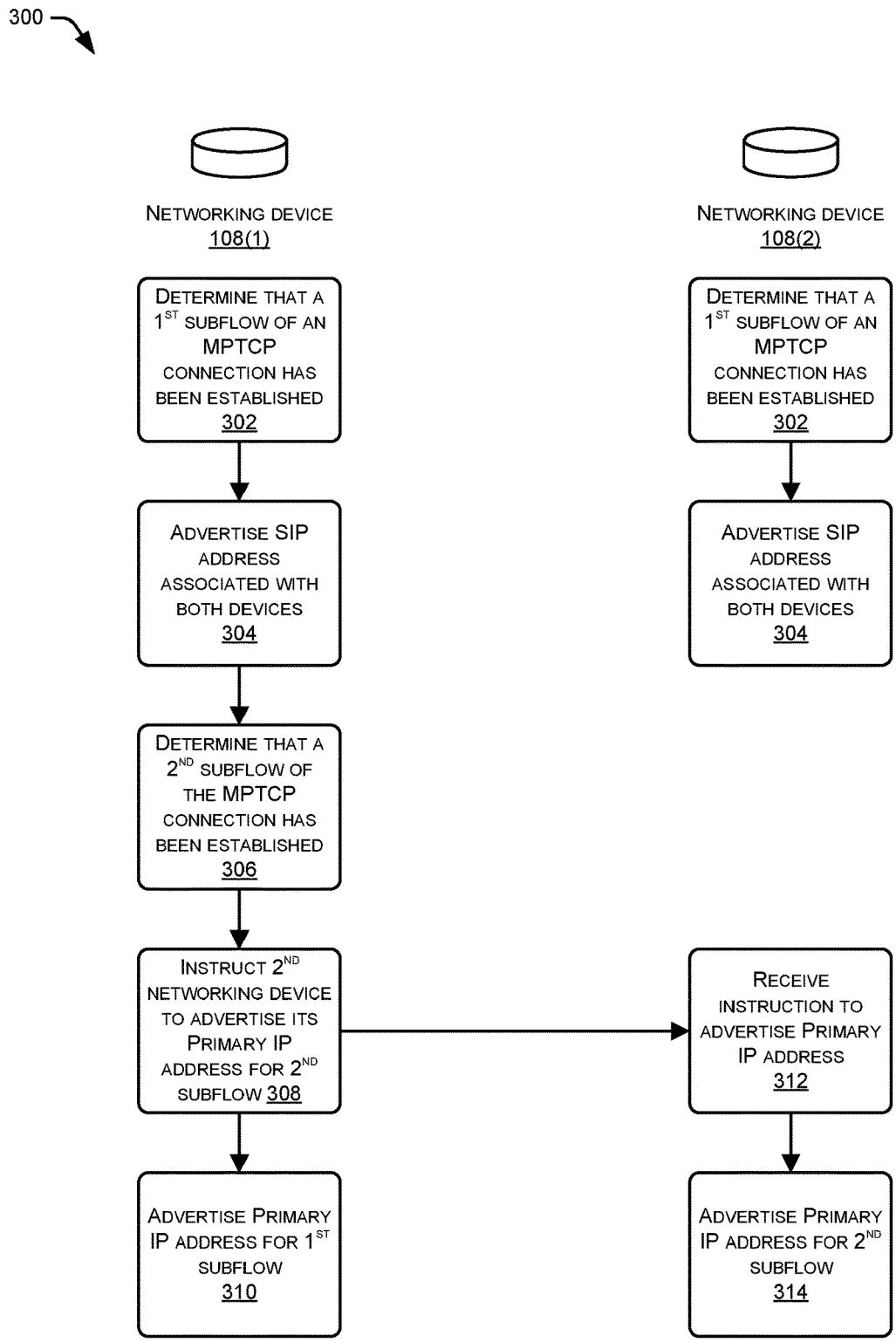
FIG. 3 illustrates example operations performed by the first and second networking devices for identifying multiple subflows of a common MPTCP connection and determining to advertise respective PIP addresses as nexthops for the respective subflows in response.

FIG. 3 illustrates example operations 300 performed by the first and second networking devices for identifying multiple subflows of a common MPTCP connection and determining to advertise respective PIP addresses for the respective subflows in response. In some instances, some or all the operations may be performed, in whole or in part, by the advertisement-determination component 122 executing on one or both of the networking devices 108(1) and 108(2).

At an operation 302, each of the networking devices 108(1) and 108(2) determine that a first subflow of an MPTCP connection has been established between a first computing device and a second computing device, such as between a first NIC of a mobile phone or other client computing device and a server computing device. At an operation 304, each of the networking devices 108(1) and 108(2) may begin advertising, for the first subflow, a secondary IP address that is virtually associated with the networking device 108(1) and the networking device 108(2). At an operation 306, the networking device 108(1) determines that a second subflow of the MPTCP connection has been established, such as between a second NIC of the first computing device and the second computing device.

At an operation 308, the networking device 108(1) instructs the networking device 108(2) to begin advertising its primary IP address (PIP) for the second subflow. In addition, the networking device 108(1) begins advertising its PIP for the first subflow at an operation 310. At an operation 312, the networking device 108(2) receives the instruction and, at an operation 314, begins advertising its PIP for the second subflow.

Figure 4A:
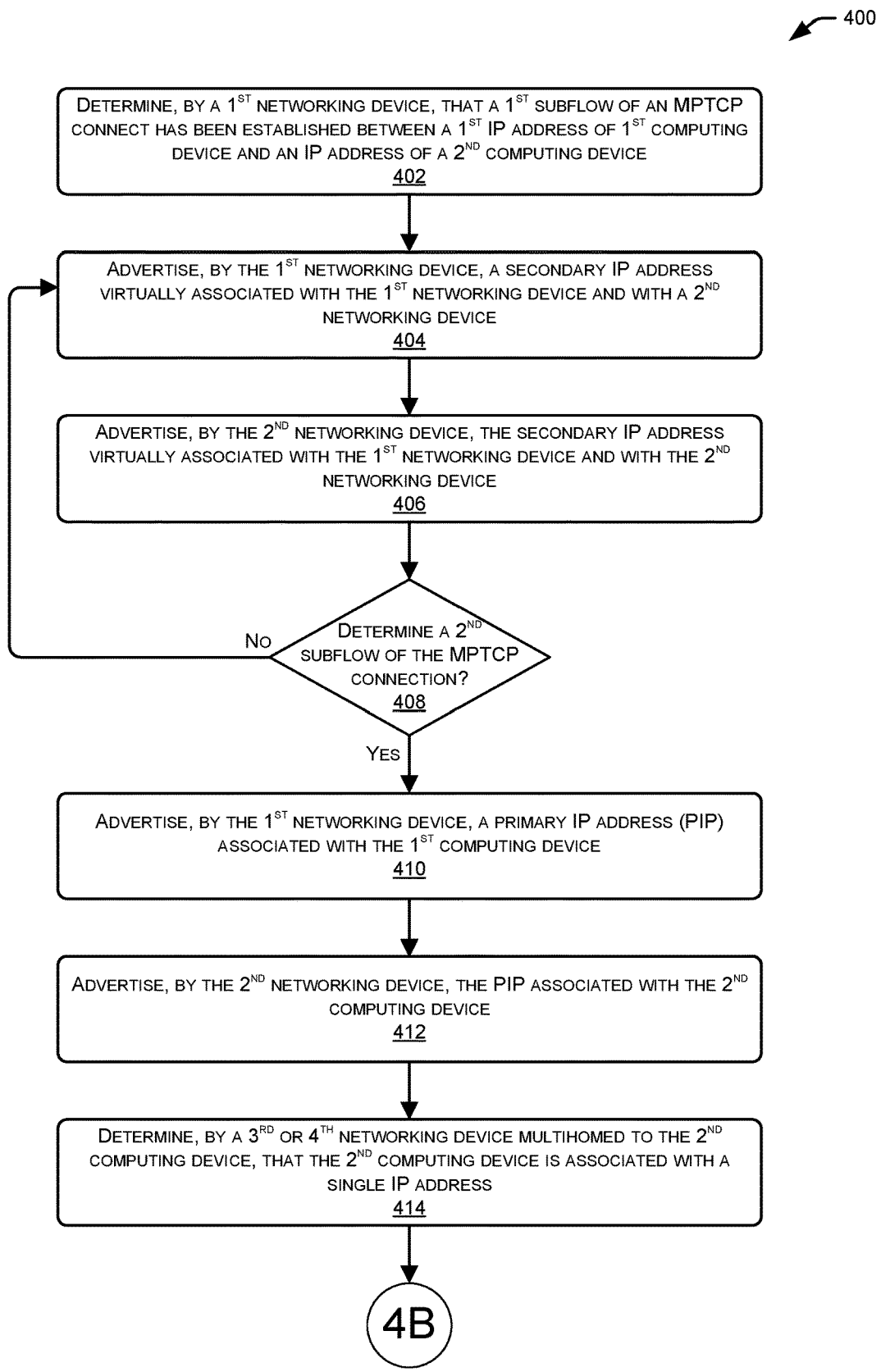
FIGS. 4A-B collectively illustrate an example process of identifying multiple subflows of a common MPTCP connection and, in response, causing a first networking device, to which the first computing device is multihomed to, to advertise its PIP address for the first subflow and the second networking device, to which the first computing device is also multihomed to, to advertise its PIP address for the second subflow.
Figure 4B:
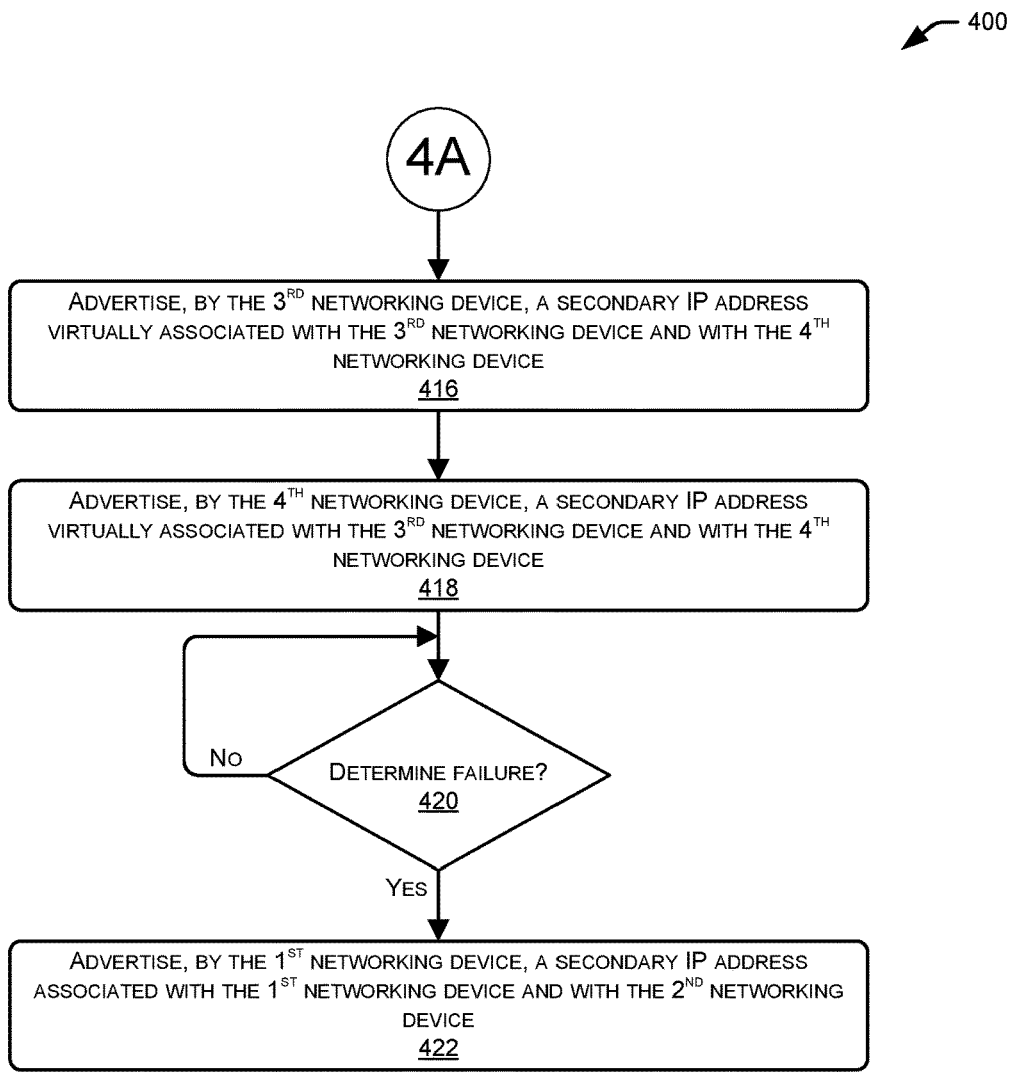

FIGS. 4A-B collectively illustrate an example process 400 of identifying multiple subflows of a common MPTCP connection and, in response, causing a first networking device to which the first computing device is multihomed to advertise its PIP address for the first subflow and the second networking device to which the first computing device is multihomed to advertise its PIP address for the second subflow.

An operation 402 represents determining, by a first networking device in a switched network, that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network. An operation 404 represents advertising, by the first networking device and prior to determining a request to establish a second subflow of the MPTCP connection, a secondary IP address associated with the first networking device and the second networking device.

An operation 406 represents advertising, by the second networking device and prior to determining the request to establish the second subflow, the secondary IP address associated with the first networking device and with the second networking device. An operation 408 represents determining, by at least one of the first networking device or the second networking device, whether a request to establish a second subflow of the MPTCP connection between a second IP address of the first computing and the IP address of the second computing device has been identified. In some instances, this operation may comprise snooping, by the first networking device, a packet indicating the request to establish the second subflow and, if identified, sending, by the first networking device, to the second networking device, and at least partly in response to snooping the packet, an instruction to cause the second networking device to advertise the PIP of the second networking device. If no such request is identified, however, then the process 400 returns to the operation 404 where the first and second networking devices continue to advertise the secondary IP address for the first subflow.

If, however, a request to establish a second subflow of the MPTCP connection is identified, then an operation 410 represents advertising, by the first networking device, a primary IP address (PIP) of the first networking device for the first subflow. In some instances, the advertising the PIP of the first networking device for the first subflow comprises advertising the PIP of the first networking device for the first subflow based at least in part on determining that the MPTCP connection is associated with the first subflow and the second subflow. In other instances, the first networking device is configured to advertise the PIP address of the first networking device for the first subflow based at least in part on the first networking device being configured by a network administrator.

Next, an operation 412 represents advertising, by the second networking device, a primary IP address (PIP) of the second networking device for the second subflow. In some instances, the advertising the PIP of the second networking device for the second subflow comprises advertising the PIP of the second networking device for the second subflow based at least in part on determining that the MPTCP connection is associated with the first subflow and the second subflow. In other instances, the second networking device is configured to advertise the PIP address of the second networking device for the second subflow based at least in part on the second networking device being configured by a network administrator. An operation 414, meanwhile, represents determining, by at least one of a third networking device, to which the second computing device is multihomed to, or a fourth networking device, to which the second computing device is also multihomed to, that the second computing device is associated with a single IP address.

FIG. 4B continues the illustration of the process 400 and includes, at an operation 416, advertising, by the third networking device, for the first and second subflows, and at least partly in response to determining that the second computing device is associated with the single IP address, a secondary IP address that is associated with the third networking device and with the fourth networking device. An operation 418 represents advertising, by the fourth networking device, for the first and second subflows, and at least partly in response to determining that the second computing device is associated with the single IP address, the secondary IP address.

An operation 420 represents determining, by the first networking device, whether a failure has occurred at the second networking device or at a network link associated with the second networking device. If not, then the first and second networking devices continue to advertise their respective PIPs for the first and second subflows, respectively. If a failure is detected, however, then an operation 422 represents advertising, by the first networking device, for the first and second subflows, and at least partly in response to determining that the failure has occurred, a secondary IP address that is associated with the first networking device and with the second networking device.

Figure 5:
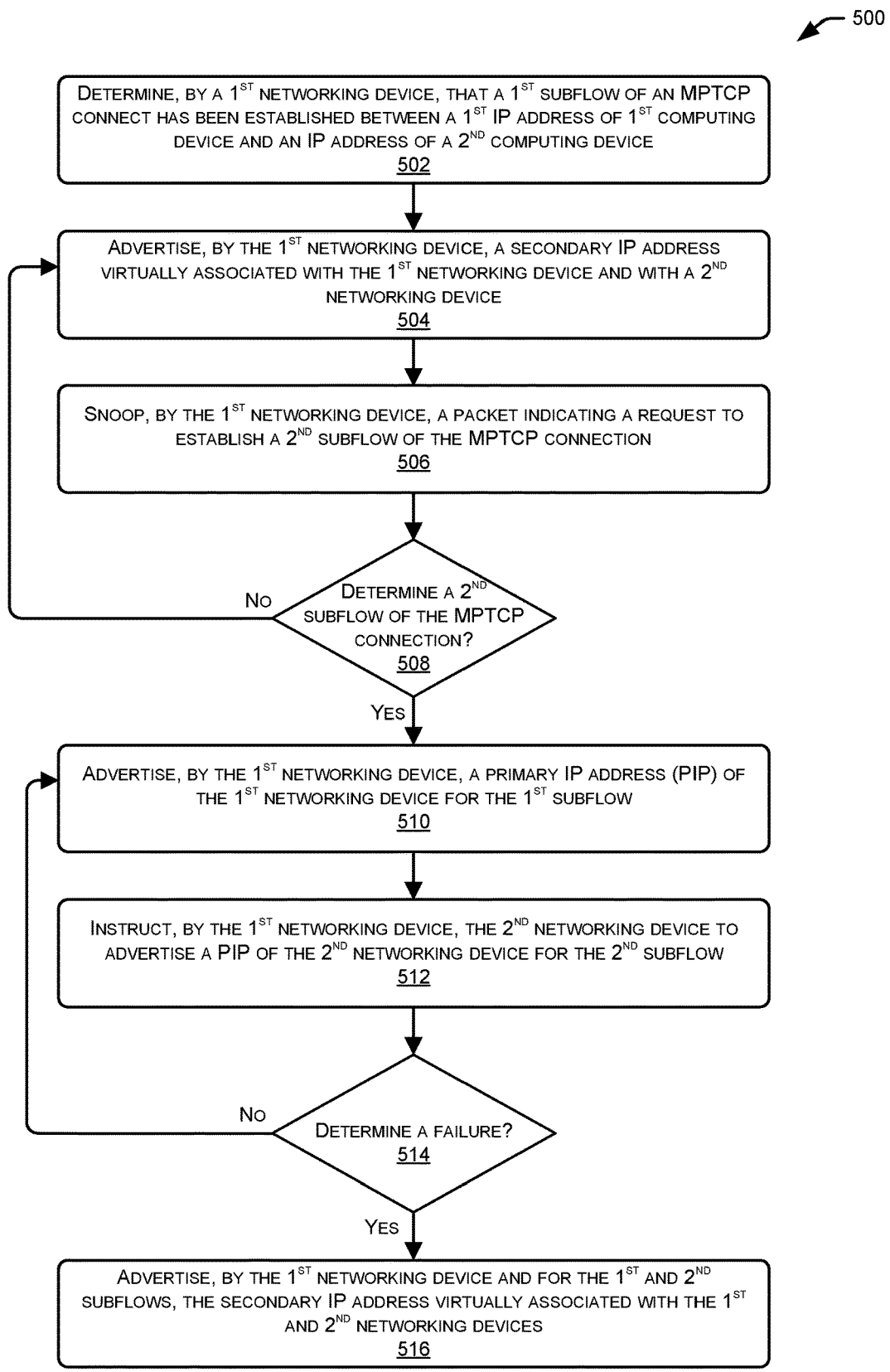
FIG. 5 illustrates another example process of identifying multiple subflows of a common MPTCP connection and, in response, causing a first networking device, to which the first computing device is multihomed to, to advertise its PIP address for the first subflow and the second networking device, to which the first computing device is also multihomed to, to advertise its PIP address for the second subflow.

FIG. 5 illustrates another example process 500 of identifying multiple subflows of a common MPTCP connection and, in response, causing a first networking device, to which the first computing device is multihomed to, to advertise its PIP address for the first subflow and the second networking device, to which the first computing device is multihomed to, to advertise its PIP address for the second subflow. In some instances, some or all of the operations may be performed by a first networking device of a switched network.

An operation 502 represents determining that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network. In some instances, the first IP address of the first computing device is associated with a network interface controller (NIC) configured to access a cellular network and the second IP address of the first computing device is associated with a NIC configured to access a wireless access point (WAP).

An operation 504 represents advertising, by the first networking device and prior to determining the request to establish the second subflow, a secondary IP address associated with the first networking device and with the second networking device. An operation 506 represents snooping a packet indicating the request to establish the second subflow.

An operation 508 represents determining whether a request to establish a second subflow of the MPTCP connection between a second IP address of the first computing device and the IP address of the second computing device has been identified. If not, the process 500 returns to the operation 504 to continue advertising the second IP address. If the second subflow is identified, however, then an operation 510 represents advertising a primary IP address (PIP) of the first networking device for the first subflow. In some instances, the advertising comprises advertising the PIP of the first networking device for the first subflow based at least in part on determining that the MPTCP connection is associated with the first subflow and the second subflow. An operation 512 represents instructing the second networking device to advertise a PIP of the second networking device for the second subflow. In some instances, the instructing comprises instructing the second networking device to advertise the PIP of the second networking device for the second subflow based at least in part on determining that the MPTCP connection is associated with the first subflow and the second subflow.

An operation 514 represents determining whether a failure has occurred at the second networking device or at a network link associated with the second networking device. If not, then the process 500 returns to the operation 510 for having the networking devices advertise their respective PIPs for the first and second subflows, respectively. If, however, a failure is detected, then an operation 516 represents advertising, for the first and second subflows and at least partly in response to determining that the failure has occurred, a secondary IP address that is associated with the first networking device and with the second networking device.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-5, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 6:
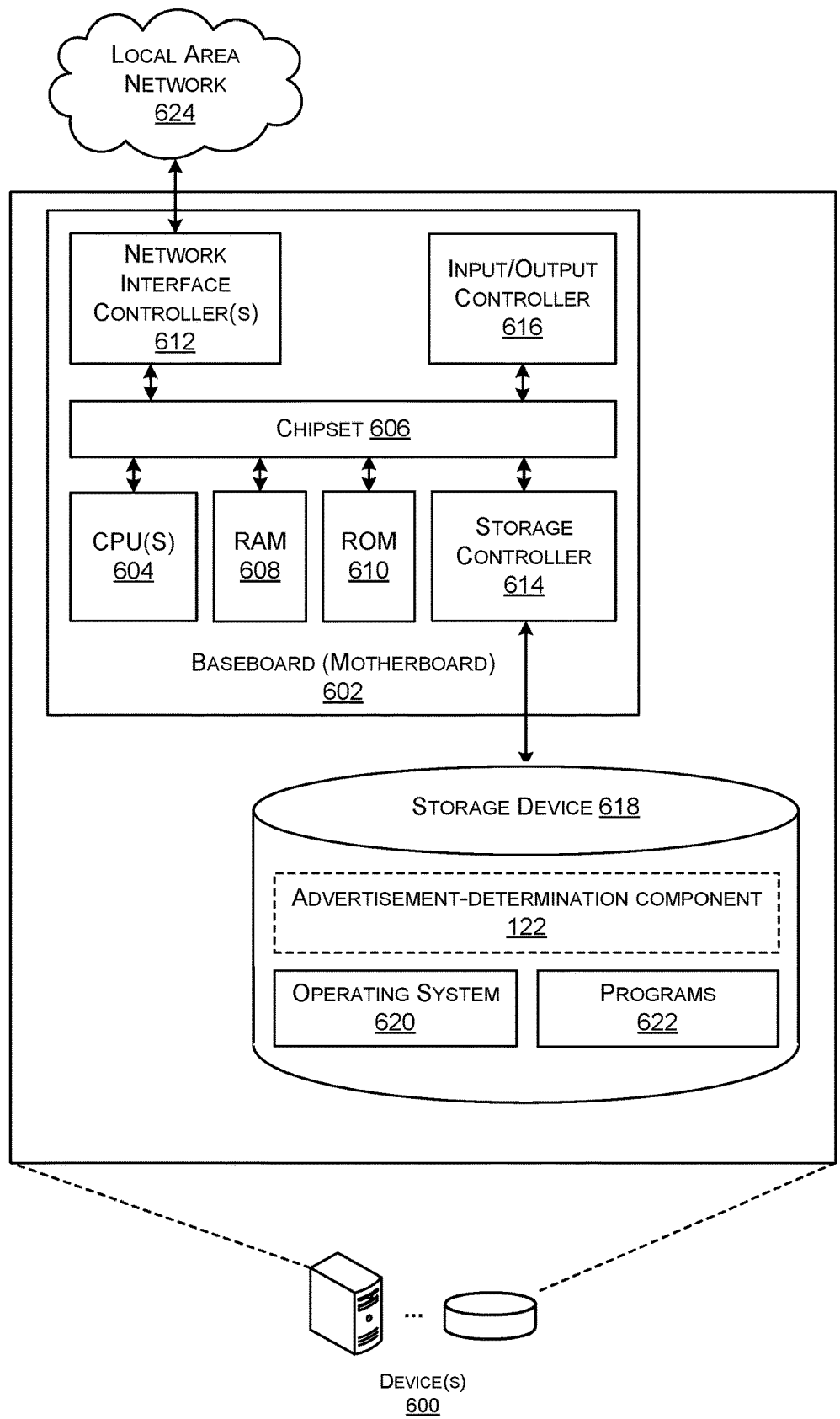
FIG. 6 is a computer architecture diagram showing an illustrative computer hardware architecture for implementing computing devices configured to implement the techniques described herein.

FIG. 6 is a computer architecture diagram showing an illustrative computer hardware architecture for implementing a device 600 that can be utilized to implement aspects of the various technologies presented herein. The computing devices 102(1) and 102(2) as well as the networking devices 108(1)-(8), discussed above, may include some or all of the components discussed below with reference to the device 600.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the devices 600 can also be configured to execute a resource manager capable of instantiating and/or managing the computing resources. In the case of VM instances, for example, the resource manager can be a hypervisor or another type of program configured to enable the execution of multiple VM instances on a single server device 600. Devices 600 in a data center can also be configured to provide network services and other types of services.

The device 600 includes a baseboard 602, or "motherboard," which is a printed circuit board to which a multitude of components or devices can be connected by way of a system bus or other electrical communication paths. In one illustrative configuration, one or more central processing units (CPUs) 604 operate in conjunction with a chipset 606. The CPUs 604 can be standard programmable processors that perform arithmetic and logical operations necessary for the operation of the device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the device 600. The chipset 606 can further provide an interface to a computer-readable storage medium such as a read-only memory (ROM) 610 or non-volatile RAM (NVRAM) for storing basic routines that help to startup the device 600 and to transfer information between the various components and devices. The ROM 610 or NVRAM can also store other software components necessary for the operation of the device 600 in accordance with the configurations described herein.

The device 600 can operate in a networked environment using logical connections to remote computing devices and computer systems through a network, such as a local area network 624. The chipset 606 can include functionality for providing network connectivity through a Network Interface Card (NIC) 612, such as a gigabit Ethernet adapter. The NIC(s) 612 is capable of connecting the device 600 to other computing devices over the network. It should be appreciated that multiple NICs 612 can be present in the device 600, connecting the computer to other types of networks and remote computer systems.

The device 600 can be connected to a storage device 618 that provides non-volatile storage for the computer. The storage device 618 can store an operating system 620, programs 622, and data, which have been described in greater detail herein. The storage device 618 can be connected to the device 600 through a storage controller 614 connected to the chipset 606. The storage device 618 can consist of one or more physical storage units. The storage controller 614 can interface with the physical storage units through a serial attached SCSI (SAS) interface, a serial advanced technology attachment (SATA) interface, an FC interface, or other type of interface for physically connecting and transferring data between computers and physical storage units.

The device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 600 can further read information from the storage device 618 by detecting the physical states or characteristics of one or more particular locations within the physical storage units.

In addition to the mass storage device 618 described above, the device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 600.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the device 600. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 618 can store other system or application programs and data utilized by the device 600.

In one embodiment, the storage device 618 or other computer-readable storage media is encoded with computer-executable instructions which, when loaded into the device 600, transform the computer from a general-purpose computing system into a special-purpose computer capable of implementing the embodiments described herein. These computer-executable instructions transform the device 600 by specifying how the CPUs 604 transition between states, as described above. According to one embodiment, the device 600 has access to computer-readable storage media storing computer-executable instructions which, when executed by the device 600, perform the various processes described above with regard to FIGS. 2A-5. The device 600 can also include computer-readable storage media having instructions stored thereupon for performing any of the other computer-implemented operations described herein.

The device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the device 600 might not include all of the components shown in FIG. 6, can include other components that are not explicitly shown in FIG. 6, or might utilize an architecture completely different than that shown in FIG. 6. The device 600 may also store, in the storage device 618, the advertisement-determination component 122 described above for performing some or all of the techniques described above with reference to FIGS. 1-5.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   determining, by a first networking device in a switched network, that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network, the first networking device and the second networking device both advertising a same initial IP address;
   determining, by at least one of the first networking device or the second networking device, a request to establish a second subflow of the MPTCP connection between a second IP address of the first computing and the IP address of the second computing device;
   advertising, by the first networking device, a primary IP address (PIP) of the first networking device for the first subflow instead of the initial IP address; and
   advertising, by the second networking device, a PIP of the second networking device for the second subflow instead of the initial IP address.

2. The method of claim 1, wherein:
   the advertising the PIP of the first networking device for the first subflow comprises advertising the PIP of the first networking device for the first subflow based at least in part on determining that the MPTCP connection is associated with the first subflow and the second subflow; and
   the advertising the PIP of the second networking device for the second subflow comprises advertising the PIP of the second networking device for the second subflow based at least in part on determining that the MPTCP connection is associated with the first subflow and the second subflow.

3. The method of claim 1, further comprising:
   advertising, by the first networking device and prior to determining the request to establish the second subflow, a secondary IP address virtually associated with the first networking device and the second networking device; and advertising, by the second networking device and prior to determining the request to establish the second subflow, the secondary IP address virtually associated with the first networking device and the second networking device.

4. The method of claim 1, wherein the advertising the PIP of the second networking device for the second subflow comprises advertising the PIP of the second networking device for the second subflow at least partly in response to determining that the first networking device is advertising the PIP of the first networking device for the first subflow.

5. The method of claim 1, further comprising:
snooping, by the first networking device, MPTCP packets indicating the request to establish the second subflow; and sending, by the first networking device, to the second networking device, and at least partly in response to snooping the packet, an instruction to cause the second networking device to advertise the PIP of the second networking device.

6. The method of claim 1, wherein:
the first networking device is configured to advertise the PIP address of the first networking device for the first subflow based at least in part on the first networking device being configured by a network administrator; and the second networking device is configured to advertise the PIP address of the second networking device for the second subflow based at least in part on the second networking device being configured by the network administrator.

7. The method of claim 1, wherein the first IP address of the first computing device is associated with a network interface controller (NIC) configured to access a cellular network and the second IP address of the first computing device is associated with a NIC configured to access a wireless access point (WAP).

8. The method of claim 1, wherein the second computing device is multihomed to at least a third networking device and a fourth networking device, and further comprising:
determining, by at least one of the third networking device or the fourth networking device, that the second computing device is associated with a single IP address;

advertising, by the third networking device, for the first and second subflows, and at least partly in response to determining that the second computing device is associated with the single IP address, a secondary IP address that is virtually associated with the third networking device and with the fourth networking device; and advertising, by the fourth networking device, for the first and second subflows, and at least partly in response to determining that the second computing device is associated with the single IP address, the secondary IP address.

9. The method of claim 1, further comprising:
determining, by the first networking device, that a failure has occurred at the second networking device or at a network link associated with the second networking device; and advertising, by the first networking device, for the first and second subflows, and at least partly in response to determining that the failure has occurred, a secondary IP address that is virtually associated with the first networking device and with the second networking device.

10. A first networking device of a switched network, comprising:
one or more processors; and
one or more computer-readable media storing computer-executable instructions that, when executed, cause the one or more processors to perform acts comprising:
determining that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network, the first networking device and the second networking device both advertising a same initial IP address;

determining a request to establish a second subflow of the MPTCP connection between a second IP address of the first computing device and the IP address of the second computing device;

advertising a primary IP address (PIP) of the first networking device for the first subflow instead of the initial IP address; and instructing the second networking device to advertise a PIP of the second networking device for the second subflow instead of the initial IP address.

11. The first networking device of claim 10, wherein:
the advertising comprises advertising the PIP of the first networking device for the first subflow based at least in part on determining that the MPTCP connection is associated with the first subflow and the second subflow; and the instructing comprises instructing the second networking device to advertise the PIP of the second networking device for the second subflow based at least in part on determining that the MPTCP connection is associated with the first subflow and the second subflow.

12. The first networking device of claim 10, wherein the one or more computer-readable media further store computer-executable instructions that, when executed, cause the one or more processors to perform an act comprising advertising, by the first networking device and prior to determining the request to establish the second subflow, a secondary IP address virtually associated with the first networking device and with the second networking device.

13. The first networking device of claim 10, wherein the one or more computer-readable media further store computer-executable instructions that, when executed, cause the one or more processors to perform an act comprising snooping a packet indicating the request to establish the second subflow, and wherein the instructing comprises instructing the second networking device to advertise the PIP of the second networking device for the second subflow at least partly in response to snooping the packet.

14. The first networking device of claim 10, wherein the first IP address of the first computing device is associated with a network interface controller (NIC) configured to access a cellular network and the second IP address of the first computing device is associated with a NIC configured to access a wireless access point (WAP).

15. The first networking device of claim 10, wherein the one or more computer-readable media further store computer-executable instructions that, when executed, cause the one or more processors to perform an act comprising:

determining that a failure has occurred at the second networking device or at a network link associated with the second networking device; and advertising, for the first and second subflows and at least partly in response to determining that the failure has occurred, a secondary IP address that is virtually associated with the first networking device and with the second networking device.

16. A method implemented by first networking device of a switched network, comprising:

determining that a first subflow of a multipath transmission control protocol (MPTCP) connection has been established between a first internet protocol (IP) address of a first computing device and an IP address of a second computing device, wherein the first computing device is multihomed to at least the first networking device and a second networking device in the switched network, the first networking device and the second networking device both advertising a same initial IP address;

determining a request to establish a second subflow of the MPTCP connection between a second IP address of the first computing device and the IP address of the second computing device;

advertising a primary IP address (PIP) of the first networking device for the first subflow instead of the initial IP address; and instructing the second networking device to advertise a PIP of the second networking device for the second subflow instead of the initial IP address.

17. The method of claim 16, wherein:

the advertising comprises advertising the PIP of the first networking device for the first subflow based at least in part on determining that the MPTCP connection is associated with the first subflow and the second subflow; and the instructing comprises instructing the second networking device to advertise the PIP of the second networking device for the second subflow based at least in part on determining that the MPTCP connection is associated with the first subflow and the second subflow.

18. The method of claim 16, further comprising advertising, by the first networking device and prior to determining the request to establish the second subflow, a secondary IP address virtually associated with the first networking device and with the second networking device.

19. The method of claim 16, further comprising snooping a packet indicating the request to establish the second subflow, and wherein the instructing comprises instructing the second networking device to advertise the PIP of the second networking device for the second subflow at least partly in response to snooping the packet.

20. The method of claim 16, wherein the first IP address of the first computing device is associated with a network interface controller (NIC) configured to access a cellular network and the second IP address of the first computing device is associated with a NIC configured to access a wireless access point (WAP).

\* \* \* \* \*